Oct. 16, 1956  R. H. J. MORNARD  2,766,774
FAUCET ASSEMBLY
Filed April 30, 1954  2 Sheets-Sheet 1
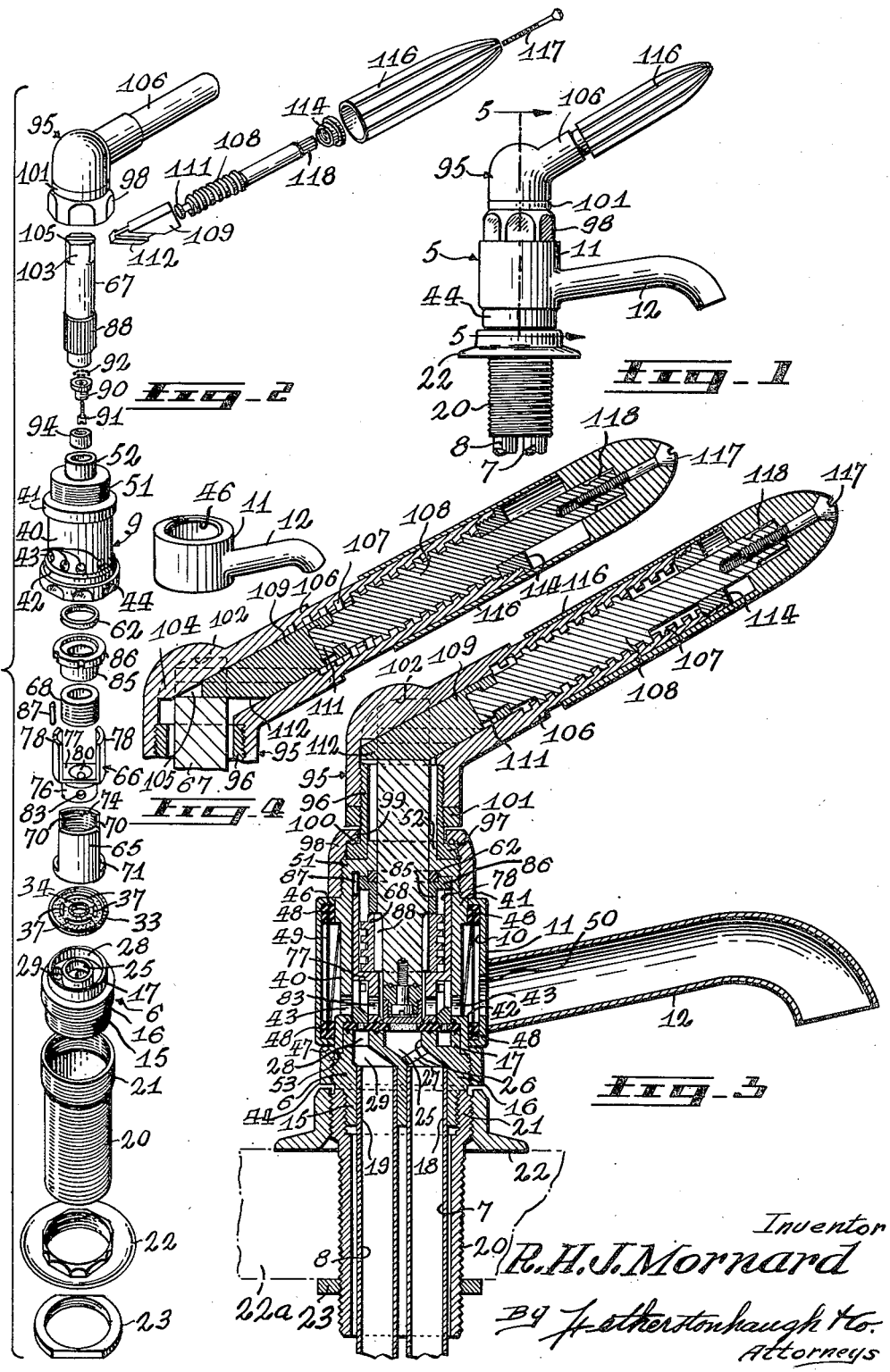
Inventor
R. H. J. Mornard
By Fetherstonhaugh & Co.
Attorneys

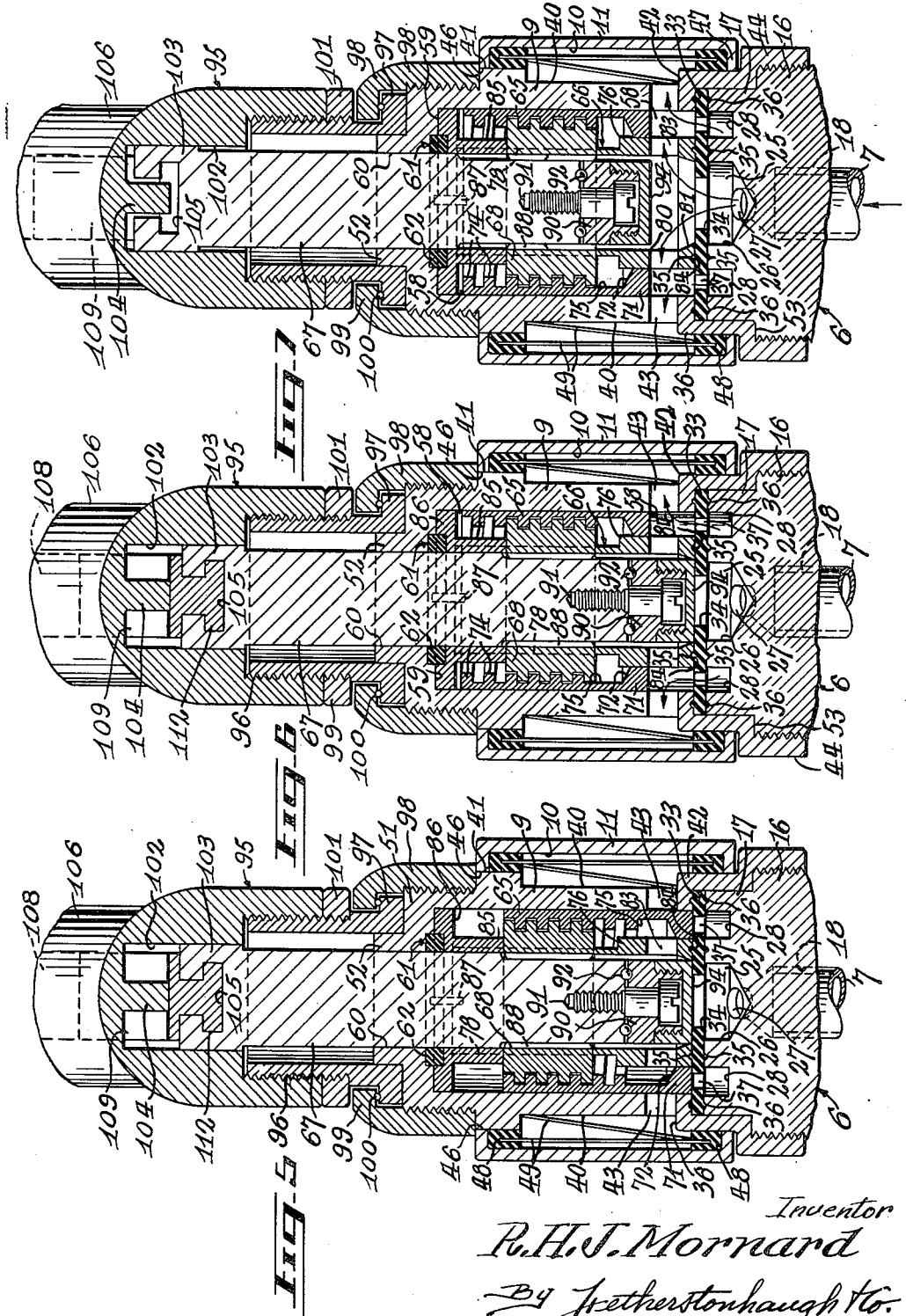

United States Patent Office 2,766,774
Patented Oct. 16, 1956

2,766,774

FAUCET ASSEMBLY

René H. J. Mornard, St. Lambert, Quebec, Canada

Application April 30, 1954, Serial No. 426,780

7 Claims. (Cl. 137—636.3)

This invention relates to faucets of the type to which either hot or cold water or a mixture thereof are delivered from a mixing chamber communicating with separate hot and cold water delivery passages equipped with selectively operable control valves.

A particular object of this invention is to provide a faucet of the character described in which independent or simultaneous operation of said control valves may be effected in response to predetermined movements of a single, manually operable, valve control member or handle.

More particularly the invention consists in the provision of a mixing faucet assembly in which the valves controlling the separate hot and cold water delivery passages are connected to the single control member or handle through motion transmitting mechanisms which permits either valve to be operated independently regardless of the position of the companion valve in addition to enabling the valves to be operated simultaneously, and which also permits the rate of opening and closing travel imparted to each valve to be controlled during both independent and simultaneous operation of the valves.

Other objects, advantages, and characteristic features of the invention will become more apparent from the following detailed description of the accompanying drawings in which the preferred embodiment of the invention is illustrated and in which—

Fig. 1 is an elevational view of a faucet assembly embodying my invention.

Fig. 2 is an exploded view in perspective of the assembly elements embodied in the faucet shown in Fig. 1.

Fig. 3 is a sectional view of the faucet assembly of Fig. 1, showing the valves and related elements in their closed position.

Fig. 4 is a sectional view of a portion of the assembly shown in Fig. 3, but with certain of the component elements in different positions.

Fig. 5 is a sectional view taken along the lines 5—5 of Fig. 1.

Fig. 6 is a view similar to Fig. 5, but showing certain component elements in different positions.

Fig. 7 is another view similar to Figs. 5 and 6, but showing certain component elements in different positions.

Referring more particularly to the drawings, 5 generally indicates a faucet assembly which includes a distributor 6 for hot and cold water lines 7 and 8 to a main body member 9 which contains a dual valve control mechanism for the regulation of a flow of hot and/or cold water to an annular mixing chamber 10 between the outer surface of the main body member 9 and a collar 11 surrounding the latter, said collar being provided with a spout 12 for the ultimate discharge of water from said faucet at any desired temperature and volume predetermined by regulation of the dual valve control mechanism hereinafter more fully described.

The distributor 6 is generally cylindrical, having a lower externally threaded section 15, an intermediate externally threaded section 16 of substantially greater diameter than section 15, and an upper, non-threaded cylindrical section 17 of lesser diameter than the intermediate section 16. The lower and intermediate threaded sections 15 and 16 are drilled to provide a pair of longitudinally extending passages 18 and 19 to receive therein the upper ends of hot and cold water lines 7 and 8 respectively which are secured in place by soldering or other suitable means.

A tubular, externally threaded shank 20, having an internally and externally threaded neck 21, is fitted about the water lines 7 and 8 with the internal threads of neck 21 in screw threaded engagement with the lower section 15 of distributor 6. A flanged, internally threaded collar 22 is screw threaded onto the external threading of neck 21 to bear against the upper surface of a sink or the like, indicated at 22a, when the shank is fitted through an opening in the sink. A lock nut 23 is threaded onto the lower end of the threaded shank 20 to bear against the under side of said sink so as to retain the faucet assembly on the sink with the hot and cold water lines 7 and 8 accommodated by a single passage through said sink.

The upper section 17 of distributor 6 has a central cavity 25 defined by an inner, vertical cylindrical wall 26. Cavity 25 is in direct communication with hot water line 7 by means of a port 27 from the base of cavity 25 to the upper ends of passage 18. Section 17 is also provided with an outer cavity 28 concentric with cavity 25 and defined by the outer surface of cylindrical wall 26 and the inner surface of the defining wall of the cylindrical section 17. Outer cavity 28 is in direct communication with cold water line 8 by means of a port 29 from the base of cavity 28 to the upper end of passage 19.

A flat flexible washer 33 is seated on the upper surface of the distributor upper section 17. Washer 33 has a central opening 34 of slightly smaller diameter than the diameter of central cavity 25 and has concentric inner and outer ribs 35 and 36 on opposing surfaces, the ribs on one surface being fitted in the circular recesses in the upper surfaces of inner and outer walls 26 and 17 which define the central and outer cavities 25 and 28. Between ribs 35 and 36 the washer is provided with a plurality of openings 37 spaced about a path concentric with the ribs and overlying the outer cavity 28.

The main body member 9 has a central cylindrical section 40 between upper and lower peripheral ribs 41 and 42 and is provided with a plurality of circumferentially spaced ports 43 adjacent the lower rib 42. A base 44 of body member 9 is of greater diameter than the lower rib 42 to provide a shoulder adjacent said lower rib 42. The collar 11, having upper and lower annular flanges 46 and 47 is fitted over the cylindrical section 40 of body member 9 to rest on the shoulder of base 44 with the inner edges of said upper and lower flanges 46 and 47 against the opposing surfaces of upper and lower ribs 41 and 42 respectively so that the opposing surfaces of the body member central section 40 and the collar 11 define said annular mixing chamber 10. Upper and lower U-shaped packing rings 48 are disposed in chamber 10 to seal the meeting edges of upper rib and flange 41—46 and lower rib and flange 42—47, respectively. Packing rings 48 are held in place by flexible spacer means 49. The collar 11 is provided with a port 50 surrounded by spout 12 for communication between the mixing chamber 10 and the spout. Above the upper rib 41 the body member has an externally threaded section 51 and a cylindrical hollow stem 52 of substantially reduced diameter projecting beyond the threaded section 51.

The base 44 of body member 9 is internally threaded to an inner shoulder 53. The base 44 is screw threaded on the intermediate section 16 of distributor 6 so that the shoulder 53 engages a shoulder formed between the upper end of intermediate section 16 and the lower end of upper section 17 of distributor 6. Beyond shoulder 53, the rib 42 of the body member 9 has a reduced cylindrical inner wall up to a second internal shoulder into which the upper, non-threaded cylindrical section 17 of distributor 6 is received with the washer 33 seated thereon when the base 44 of the body member 9 is screw threaded about the distributor 6. The internal shoulder of rib 42 has a circular recess in the surface thereof to receive the outer rib 36 on the upper surface of washer 33. Beyond the internal shoulder of rib 42 the inner surface of body member 9 forms an elongated cylindrical valve chamber 58 which extends to a third internal shoulder 59 located within the upper externally threaded section 51. The ports 43 in the central section 40 provide communication between valve chamber 58 and mixing chamber 10. The remainder of the body member 9 has a cylindrical bore of further reduced diameter, as indicated at 60, which continues through stem 52. Bore 60 is recessed at 61 adjacent shoulder 59 to receive a packing ring 62.

The dual control valve assembly within the body member 9 comprises an outer tubular valve member 65, an inner lock member 66 interfitted with the outer valve member, a spindle 67 having an inner valve assembly, a centrally bored screw 68 rotatable by spindle 67 to slide outer valve member 65 relative to inner lock member 66 within the valve chamber 58, and a flanged retaining sleeve which serves to prevent vertical movement of screw 68 during said sliding action of outer valve member 65, as hereinafter more fully explained. The tubular valve member 65 is provided with opposing vertical slots 70 in its side wall which extend from the upper edge to a base section 71. The inner surface of base section 71 is shaped to provide a tapering shoulder 72 toward a vertical central opening of reduced diameter. The base section 71 is seatable on washer 33 between ribs 35 and 36 so as to cover the spaced openings 37 in said washer which overlie the outer cavity 28 in distributor 6. The inner surface of the tubular valve member 65 has female thread projections 74 which extend from the upper edge and terminate above shoulder 72 of base section 71. The non-threaded portion between threads 74 and shoulder 72 forms an intermediate annular chamber 75 which is intersected by the vertical slots 70 in the tubular wall of valve member 65.

The inner lock member 66 comprises a cylindrical base portion 76, a cross plate 77 on the upper surface of base 76 and having its terminals extending beyond opposite sides of the base, and vertically directed panels 78 extending upwardly from the terminals of cross plate 77. The inner lock member 66 is slidably fitted in outer valve member 65 with the cylindrical base 76 projecting through the vertical central opening in the valve base section 71 and with cross plate 77 extending across the valve member above the base 76 so that panels 78 are disposed to lie along the length and breadth of the vertical slots 70. Panels 78 are curved on their outer surfaces to conform to the cylindrical contour of valve member 65 and on their inner surfaces to conform to the contour of the inner surface of the valve member side wall from which the female threads 74 project so that movement of the outer valve member 65 through the medium of screw 68 will be relative to the inner lock member 66. The cylindrical base 76 and cross plate 77 of inner lock member 66 are centrally bored to provide an inner annular chamber 80, and an annular shoulder 81 at the base of chamber 80 which tapers to a restricted central opening in the bottom wall thereof. Ports 83 are provided in the side wall of base 76 from the inner chamber 80. The under surface of base 76 is provided with a circular groove 84 which straddles inner rib 35 on the upper surface of washer 33 when the inner lock member 66 is seated on said washer.

When outer valve member 65 and inner lock member 66 are assembled in interfitting relation, screw 68 is threaded into engagement with the female threading 74 of valve 65 until the screw is brought to bear against cross plate 77. A sleeve 85 having a flange 86 is fitted within the assembled valve and lock members with the lower edge of the sleeve bearing against screw 68 and the under surface of flange 86 bearing against the upper edges of inner lock panels 78. A pin 87 engages flange 86, body 9 and one panel 78 to prevent rotation of sleeve 85 and inner lock 66 relative to one another. The assembly is then slidably fitted into the valve chamber 58 of the main body member 11 so that the upper surface of flange 86 bears against the inner shoulder 59. Sleeve 85 is provided with an annular recess adjacent flange 86 which is complementary to recess 61 in the bore 60 at shoulder 59 to receive the packing ring 62. This assembly of the valve parts takes place before the body member 9 is screw threaded on distributor 6.

Spindle 67 extends through the bore 60 of stem 52 and through sleeve 85. That portion of the spindle below sleeve 85 is of reduced diameter so as to extend into the chamber 80 of the base 76 of inner lock 66 in spaced relation to the side wall of said chamber. The reduced portion of spindle 67 above the chamber 80 is provided with longitudinally extending splines 88 which mesh with complementary ribs in the central bore of screw 68 to rotate said screw in response to rotation of the spindle 67.

Spindle 67 is provided at its lower end with an inner valve assembly comprising a cylindrical block 90 secured to the under side of spindle 67 by screw 91. Screw 91 has a smooth shank portion which permits rotation of the screw relative to block 90 in response to rotation of spindle 67. Bearings 92 between the adjacent surfaces of the spindle and block also afford free rotary movement of spindle 67 relative to block 90. The lower end of block 90 has a reduced threaded shank to receive a cap 94 which is slidable through the bottom opening at the base of chamber 80 of inner lock member 66, in response to vertical movement of spindle 67, so as to be seated on washer 33 over the central opening 34 which overlies the central cavity 25 of distributor 6.

The upper end of spindle 67 extends into a turret assembly, generally indicated at 95, mounted on the upper end of main body member 11. Turret 95 is internally threaded to receive a hollow threaded shank 96 having a flange 97 at its outer end. Shank 96 is slidably fitted on stem 52 against the upper end of externally threaded section 51 of body member 9. An internally threaded collar 98 having an annular shoulder 99 is slidably fitted over shank 96 and is screw-threaded on said threaded section 51 to bear against rib 41 and the upper edge of collar 11. Bearings 100 between the opposing surfaces of shank flange 97 and the annular shoulder 99 of collar 98 permit rotation of shank 96 relative to the body member 9. A lock nut 101 is screw threaded on shank 96 to a point adjacent collar 98 which permits free rotation of the collar but which restricts vertical movement of same relative to the shank. Turret 95 is screw threaded on the shank to bear against lock nut 101.

The turret dome is recessed, as indicated at 102, to receive the rectangular top 103 of spindle 67 and is also provided with a medial depending web 104 which is receivable in the stem portion of a T-shaped channel 105 in the upper face of spindle top 103, channel 105 having its head portion extending transversely across said top. The under surface of web 104 is inclined to recede toward an inclined hollow handle 106 integrally formed with the turret dome to project from one side thereof. The interior of handle 106 is substantially rectangular as viewed in cross section, the rectangular walls being helically grooved, as indicated at 107, for a substantial portion of their length for the spiral travel of a screw shaft 108 in the longitudinal direction of said handle. A rectangular transfer slide 109, which is slidable longitudinally in the rectangular interior of handle 106, has a T-slot in its upper end into which a stud 111 on the inner end of screw shaft 108 is receivable for rotation of the screw shaft 108 relative to said transfer slide so that spiral movement of the screw shaft 108 in handle 106 imparts sliding movement to said transfer slide 109 along said handle. The transfer slide 109 is provided with a T-shaped runner 112 which is slidable in the T-shaped channel 105 in spindle top 103. The head portion of runner 112 is horizontally disposed so that longitudinal movement of transfer slide 109 down the inclined handle 106 imparts a forward horizontal sliding movement to the runner 112 along channel 105 which translates a vertical descending movement to the spindle 67 to cause the inner valve assembly at the lower end of the spindle to be seated on the washer 33 over its central opening 34. Retraction of transfer slide 109 along the handle 106 imparts a reverse sliding movement of runner 112 along the T-shaped channel 105 and a resultant vertical lift to the spindle 67. As the spindle continues to ascend in the rectangular recess 102 of the turret dome the stem portion of T-shaped channel 105 straddles the depending web 104.

The transfer slide screw shaft 108 is retained in the handle 106 by means of a hollow screw plug 114 which is slidably fitted over the outer shank portion of shaft 108 and threadedly received in the end of handle 106 to limit outward movement of the screw portion of shaft 108. An elongated cap 116 on the outer end of screw shaft 108 is telescopically fitted over the outer surface of handle 106. Cap 116 is retained on shaft 108 by a screw 117 and imparts rotation to shaft 108 by means of a spline connection, indicated at 118, between opposing surfaces of the cap and shaft.

In the fully closed position of the assembly, as shown in Figs. 3 and 5, it will be seen that cap 116 and handle 106 are in a telescopically collapsed relation with screw shaft 108 descended to the bottom of the helical grooves in handle 106 and transfer slide 109 projected forwardly into the recess 102 in the dome of turret 95. The forward projection of transfer slide 109 along the inclined plane of the handle 106 causes the T-shaped runner 112 which is slidable in the T-shaped channel 105 of the spindle top 103 to translate a vertical descending movement to spindle 67 through the bore 60 of the main body member stem 52, through sleeve 85, and into the central opening in the bottom wall of the inner lock member base portion 76 so that the valve assembly on the lower end of spindle 67 is seated on washer 33 over the central opening 34 therein. The outer valve member 65 is moved downwardly relative to inner lock member 66 through the medium of screw 68, which is rotated by spindle 67, so that the base 71 of member 65 is seated on washer 33 over the spaced openings 37 which communicate with the outer cavity 28 in distributor 6. In this closed position of the assembly it will be seen that the side ports 83 from the inner chamber 80 of the inner lock member base portion 76 are in a position of communication with the annular chamber 75 of outer valve member 65, which is in turn communicable with the mixing chamber 10 through the vertical slots 70 in member 65 and side ports 43 in the main body member 9.

If it is desired to provide a stream of hot water only, the handle cap 116 is rotated about handle 106 causing screw shaft 108 to travel outwardly along the internal helical grooves 107. This action retracts transfer slide 109, as shown in Fig. 4, which, in turn, raises spindle 67 (see Fig. 7) through the medium of transfer slide runner 112 in T-shaped channel 105 in the top 103 of said spindle, thus unseating the inner valve assembly on the lower end of spindle 67. As the spindle ascends in the turret dome, the stem portion of the T-shaped channel 105 in the top 103 of the spindle straddles the depending web 104 in the turret dome. This ensures positive alignment of the channel 105 with the runner 112 of transfer slide 109 which is being retracted from the channel 105. Although the runner of the transfer slide 109 is never completely retracted, it is desirable to ensure alignment in order to prevent jamming of the runner in the channel which might result if rotation of the spindle relative to the transfer slide occurred.

The unseating of the inner valve assembly permits the flow of hot water through the central cavity 34 in washer 33, into the inner chamber 80 of the base portion 76 of inner lock member 66, through side ports 83 to annular chamber 75 of outer valve member 65, through vertical slots 70 and side ports 43 into mixing chamber 10 and thence through side port 50 in collar 11 to spout 12. The degree of rotation of cap 116 will determine the amount which the spindle is raised to regulate the volume of the hot water flow.

In order to provide cold water, the turret 95 is rotated relative to the main body member 9 on the bearings 100 which permit hollow shank 96 screw threaded in the turret to rotate relative to collar 98 which is threaded on section 51 of the main body member 9. The spindle 67, which is rotated with the turret, rotates screw 68 which engages the threaded projections 74 in outer valve member 65 causing the latter to ascend in the main body chamber relative to the inner lock member 66 to unseat the outer valve member 65, as shown in Figs. 6 and 7. The cold water is then permitted to flow through the outer spaced openings 37 in washers 33, and side ports 43 in main body 9 into mixing chamber 10 and thence through the side port 50 in collar 11 to spout 12. The degree of rotation of turret 95 relative to main body member 9 will determine the amount which the outer valve member 65 is raised to regulate the volume of the cold water flow.

When only cold water is desired, the turret 95 is rotated by swinging the handle 106 about the axis of the turret without at the same time rotating cap 116 about the axis of handle 106. The inner valve assembly will remain seated over the central opening 34 in pressure contact with the washer 33. However, rotation of the turret 95 will rotate spindle 67. In order to prevent frictional wear on the washer, the inner valve assembly and the lower end of spindle 67 are connected with bearings 92 therebetween which permit rotation of the spindle relative to the inner valve assembly.

When it is desired to provide a mixture of hot and cold water, both the handle cap 116 and the turret 95 are rotated as above described to raise the inner and outer valves as shown in Fig. 7. The cap 116 and the turret 95 can be rotated about their separate axes either independently or simultaneously and to any desired degree to adjust both the volumes and proportions of hot and cold water to be admitted to the mixing chamber 10 for ultimate discharge through the nozzle 12 of any desired volume of water at any desired temperature.

What I claim is:

1. A faucet assembly comprising a body member having a receiving chamber, a discharge spout in communication with said chamber, a pair of separated fluid supply passages opening into said chamber, a pair of valve members each operable to control and regulate the delivery of fluid from one of said supply passages to said chamber, a handle member mounted on said body member, said handle member being rotatable about its central longitudinal axis and being also swingable about a second axis extending at an angle to said central longitudinal axis, a valve actuating member slidably and rotatably mounted in said body member, said valve actuating member being connected to one valve member to open and close the same in response to sliding movement of said valve actuating member and being slidably connected to the other valve member to rotate the latter in response to rotation of said valve actuating member, means co-acting with said last mentioned valve member to effect opening and closing sliding movements of said valve member in response to rotation thereof by said valve actuating member, means for imparting sliding movement to said valve actuating member in response to rotation of said handle member about its central longitudinal axis and means for rotating said valve actuating member in response to swinging movement of the handle member about said second mentioned axis.

2. A faucet assembly comprising a cylindrical body member provided with a central bore, an annular mixing chamber surrounding said cylindrical body member and having a discharge spout, means communicating between said chamber and said bore adjacent one end of said bore, a pair of separated fluid supply passages opening into said end of the bore adjacent said communicating means, a pair of independently movable valves each slidably arranged within said bore to control and regulate the delivery of fluid from one of said supply passages to said chamber, means operable to effect either independent or simultaneous sliding movement of said valves in either of their valve closing and valve opening direction, a cylindrical distributor for said fluid passages, said distributor being provided with a pair of longitudinal passages extending inwardly for a substantal distance from one end, a pair of fluid supply lines secured in said passages, the other end of said distributor being provided with a central circular cavity and a port between said central cavity and one of said passages, and being provided with an outer circular cavity concentric with said central cavity and a port between said outer cavity and the other of said passages, said distributor being fitted against the lower end of said body member to position the upper open ends of said central and outer cavities substantially adjacent the said communicating means to said annular receiving chamber, and said valves each being slidably mounted within said body member bore in alignment with one of said distributor cavities.

3. A faucet assembly as set forth in claim 2, including a disc washer arranged to overlie the cavity end of said distributor, said washer being provided with a central opening registering with said central cavity and a plurality of openings spaced about said central opening along a path concentric with said central opening and registering with said distributor outer cavity, one of said valves being slidably mounted within the bore of said body member to overlie the washer central opening and marginal defining edges thereof and the other valve being slidably mounted to overlie said spaced concentric openings and the marginal defining edges thereof.

4. A faucet assembly as set forth in claim 2, including a tubular shank fitted over portions of said supply lines adjacent said distributor and secured to said distributor, said shank being receivable in an opening through a sink so as to convey said supply lines to the faucet assembly through a single opening in the sink which is common with the opening provided in a sink for mounting said faucet assembly.

5. A faucet assembly comprising a cylindrical body member provided with a central bore, an annular mixing chamber surrounding said cylindrical body member and having a discharge spout, means communicating between said chamber and said bore adjacent one end of said bore, a pair of separated fluid supply passages opening into said end of the bore adjacent said communicating means, a pair of independently movable valves each slidably arranged within said bore to control and regulate the delivery of fluid from one of said supply passages to said chamber, one of said valves comprising a tubular valve member slidably fitted in said bore of the body member adjacent the cylindrical surface of said bore, said tubular valve member being provided with a centrally apertured, circular base portion serving to open and close one of said fluid supply passages, said tubular valve member being also provided with opposing vertical slots in its side wall extending from its upper edge to a point adjacent the base thereof, a lock member slidably fitted in said tubular valve member and comprising a centrally apertured, cylindrical base portion extending through said opening in the base of said tubular valve member and having cross members projecting outwardly from the sides of said lock member base at the upper end thereof, said cross members extending into the opposing slots of the tubular valve member and being provided with upwardly projecting panels at the terminals thereof, said panels being curved to lie within the plane of the tubular valve member, a centrally bored screw disposed within said tubular valve member and seated on the cross members of said lock member, said screw being provided with external helical threads interfitted with complementary internal threads projecting from the inner surface of said tubular valve member, a collar fitted within the bore of said body member against said screw to prevent displacement of said screw in the direction of the longitudinal axis of the bore of said body member, said collar having a peripherally extending flange which is butted against the upper edges of said lock member panels to prevent displacement of said lock member in the direction of the longitudinal axis of said bore of the body member, the other of said valves comprising a spindle portion slidably fitted in the bore of said screw for rotation of same, said spindle extending along the longitudinal axis of the bore of said body member, and a valve portion at the inner end of said spindle portion, said valve portion being slidable with said spindle portion through the central opening in said lock member base to open and close the other of said fluid supply passages, and means operable for imparting independent or simultaneous sliding and rotary movements to said spindle characterized in that the rotary movement of the spindle effects rotation of said screw to translate sliding movement of said tubular valve member along the longitudinal axis of the bore of said body member.

6. A faucet assembly as set forth in claim 5, in which said valve portion carried by said spindle is mounted thereon to permit rotation of the spindle portion relative to said valve portion.

7. A faucet assembly comprising a cylindrical body member provided with a central bore and a recess of substantial width about its periphery, a collar member fitted about said body to cover said peripheral recess to define an external annular receiving chamber therebetween, a spout carried by said collar in communication with said chamber, means communicating between said chamber and said bore adjacent one end of said bore, a pair of separated fluid supply passages opening into said end of the bore adjacent said communicating means, a pair of concentric, independently movable valves, each slidably arranged within and in axial alignment with said bore to control and regulate the delivery of fluid from one of said supply passages to said chamber, and a valve operating means connected to both of said valves and operable to effect either independent or simultaneous sliding movement of said valves in either of their valve closing and valve opening directions.

References Cited in the file of this patent
UNITED STATES PATENTS

| | | |
|---|---|---|
| 1,919,234 | Leigh | July 25, 1933 |
| 2,083,360 | Brinkman | June 8, 1937 |